(12) United States Patent
Sato et al.

(10) Patent No.: US 7,266,397 B2
(45) Date of Patent: Sep. 4, 2007

(54) PORTABLE TERMINAL APPARATUS

(75) Inventors: Toshiaki Sato, Tokyo (JP); Kanae Fukamatsu, Tokyo (JP); Yoshiko Sakamoto, Tokyo (JP); Tetsuya Kohno, Kanagawa (JP); Kayo Sasaki, Tokyo (JP); Mizuho Ikeda, Kanagawa (JP); Mototsugu Tsutsui, Kanagawa (JP)

(73) Assignees: Sony Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 515 days.

(21) Appl. No.: 10/643,028

(22) Filed: Aug. 18, 2003

(65) Prior Publication Data

US 2004/0110540 A1 Jun. 10, 2004

(30) Foreign Application Priority Data

Aug. 19, 2002 (JP) .............................. 2002-237976

(51) Int. Cl.
*H04M 1/00* (2006.01)
*H04B 1/38* (2006.01)

(52) U.S. Cl. ................. 455/575.1; 455/90.3; 455/550.1

(58) Field of Classification Search ............. 455/550.1, 455/575.6, 575.8, 90.3, 575.1; 379/433.11
See application file for complete search history.

(56) References Cited

U.S. PATENT DOCUMENTS

| | | | |
|---|---|---|---|
| 5,237,607 A * | 8/1993 | Diamantis ................... 379/419 | |
| 5,946,636 A | 8/1999 | Uyeno et al. | |
| 6,201,867 B1 * | 3/2001 | Koike ................... 379/433.11 |
| 6,600,662 B1 * | 7/2003 | Emmert et al. ............. 361/814 |
| 6,608,996 B1 * | 8/2003 | Laurikka et al. ........... 340/7.55 |
| 6,690,955 B1 * | 2/2004 | Komiyama ................. 455/566 |
| 6,771,938 B2 * | 8/2004 | Lustila et al. .......... 379/376.01 |
| 6,868,259 B1 * | 3/2005 | Kitamura et al. .......... 455/90.3 |
| 6,907,262 B1 * | 6/2005 | Heaysman ............... 455/550.1 |
| 6,990,361 B2 * | 1/2006 | Lutche et al. .............. 455/567 |
| 2001/0018332 A1 * | 8/2001 | Lustila et al. ................. 455/90 |

FOREIGN PATENT DOCUMENTS

| | | |
|---|---|---|
| JP | 6 97994 | 4/1994 |
| JP | 2001 69209 | 3/2001 |
| JP | 2001 268195 | 9/2001 |
| JP | 2002 64599 | 2/2002 |
| JP | 2002-125016 | 4/2002 |

* cited by examiner

*Primary Examiner*—Tilahun Gesesse
(74) *Attorney, Agent, or Firm*—Frommer Lawrence & Haug LLP; William S. Frommer; Thomas F. Presson

(57) ABSTRACT

Disclosed herein is a portable terminal apparatus having a novel surface lighting portion which can appeal to user's vision intensively and variously and can effectively make the notification of incoming calls or the like by means of light. The portable terminal apparatus includes a housing, a surface lighting portion provided on the outer surface of the housing, and a panel member detachably mounted on the housing so as to cover the surface lighting portion. At least a part of the panel member is transparent or semitransparent. The surface lighting portion has a flat outer surface, and the panel member is a flat plate like member, wherein the housing has a device for holding the flat plate like member placed on the flat outer surface of the surface lighting portion. The whole of the surface lighting portion is illuminated upon receiving an incoming call, for example, and the panel member is also illuminated according to a pattern formed thereon.

12 Claims, 15 Drawing Sheets

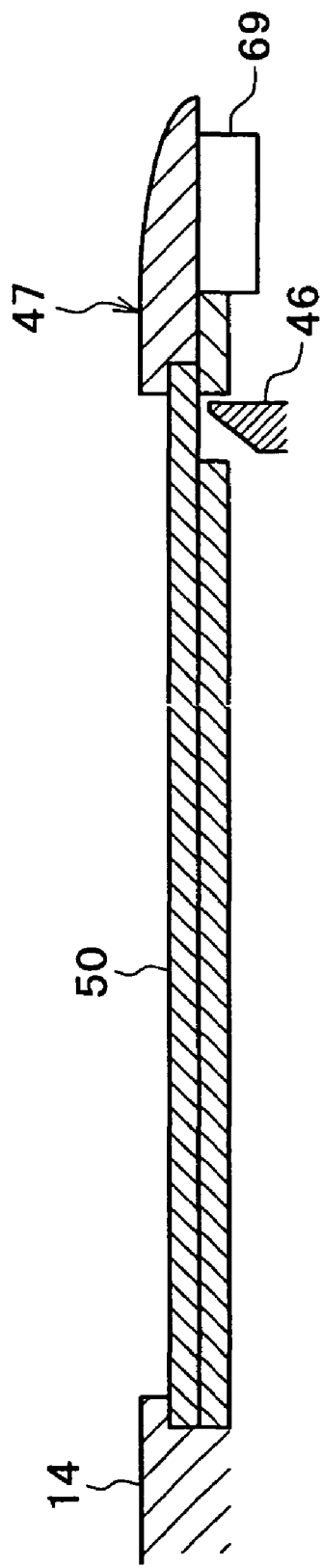
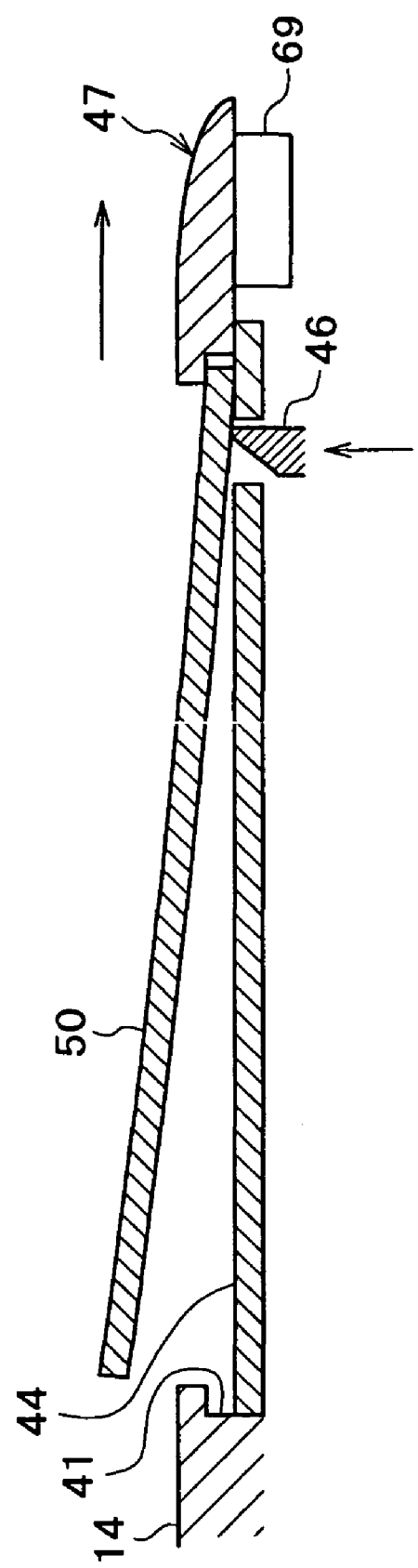

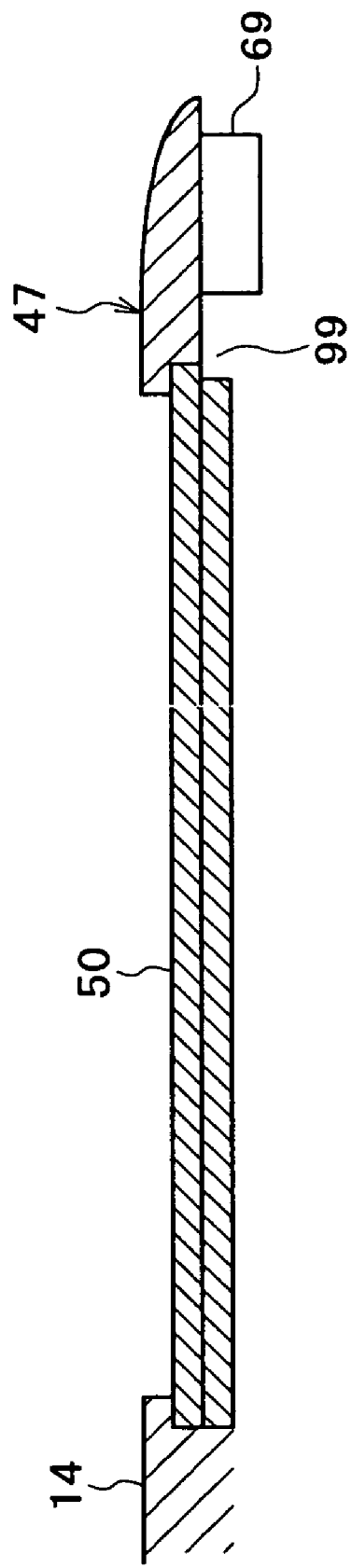
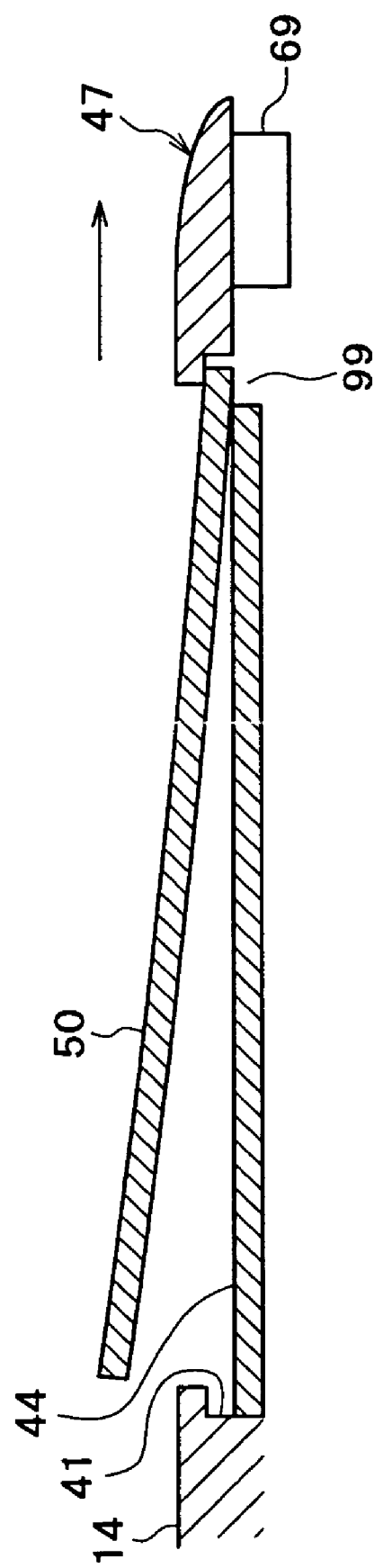

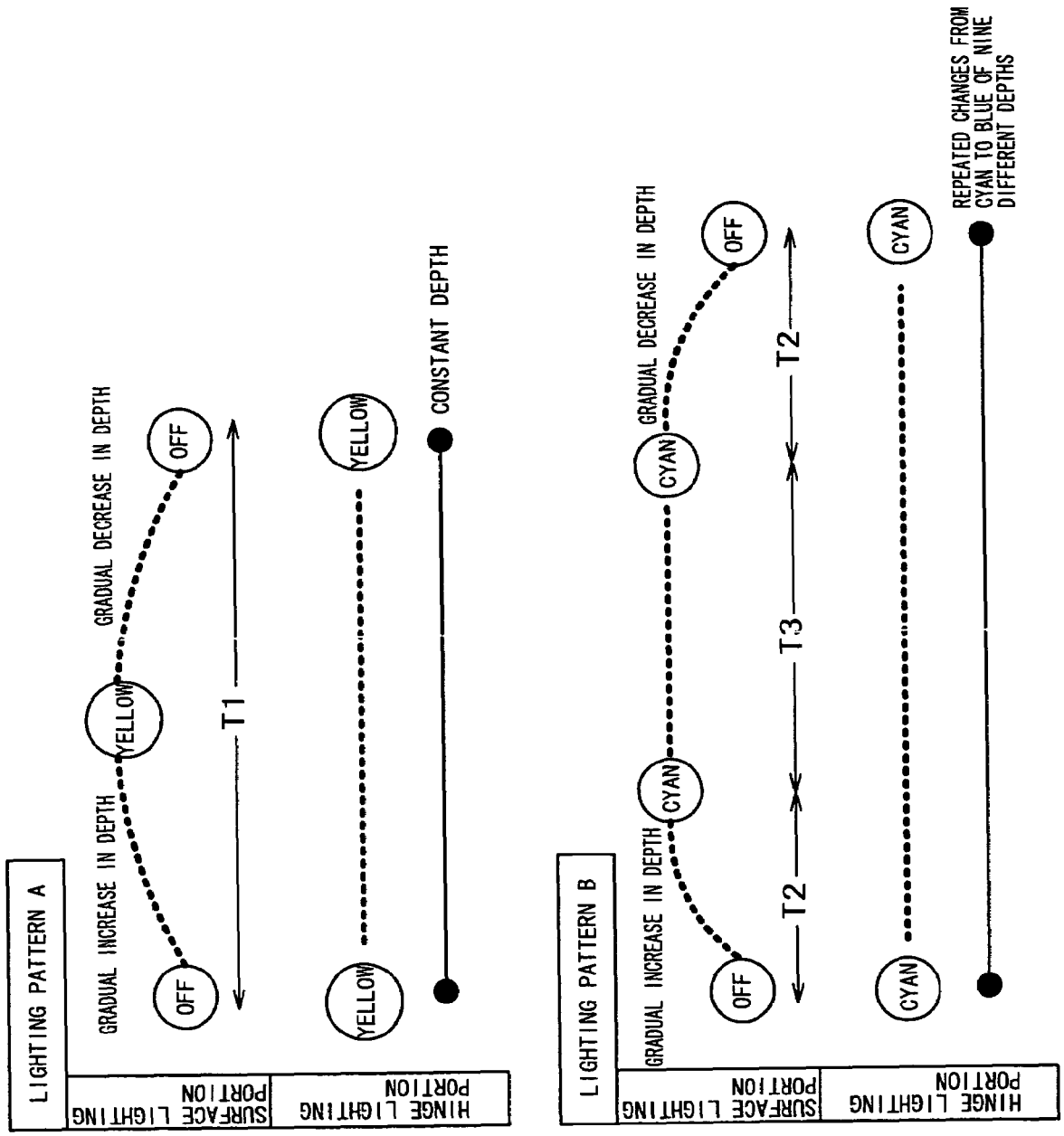

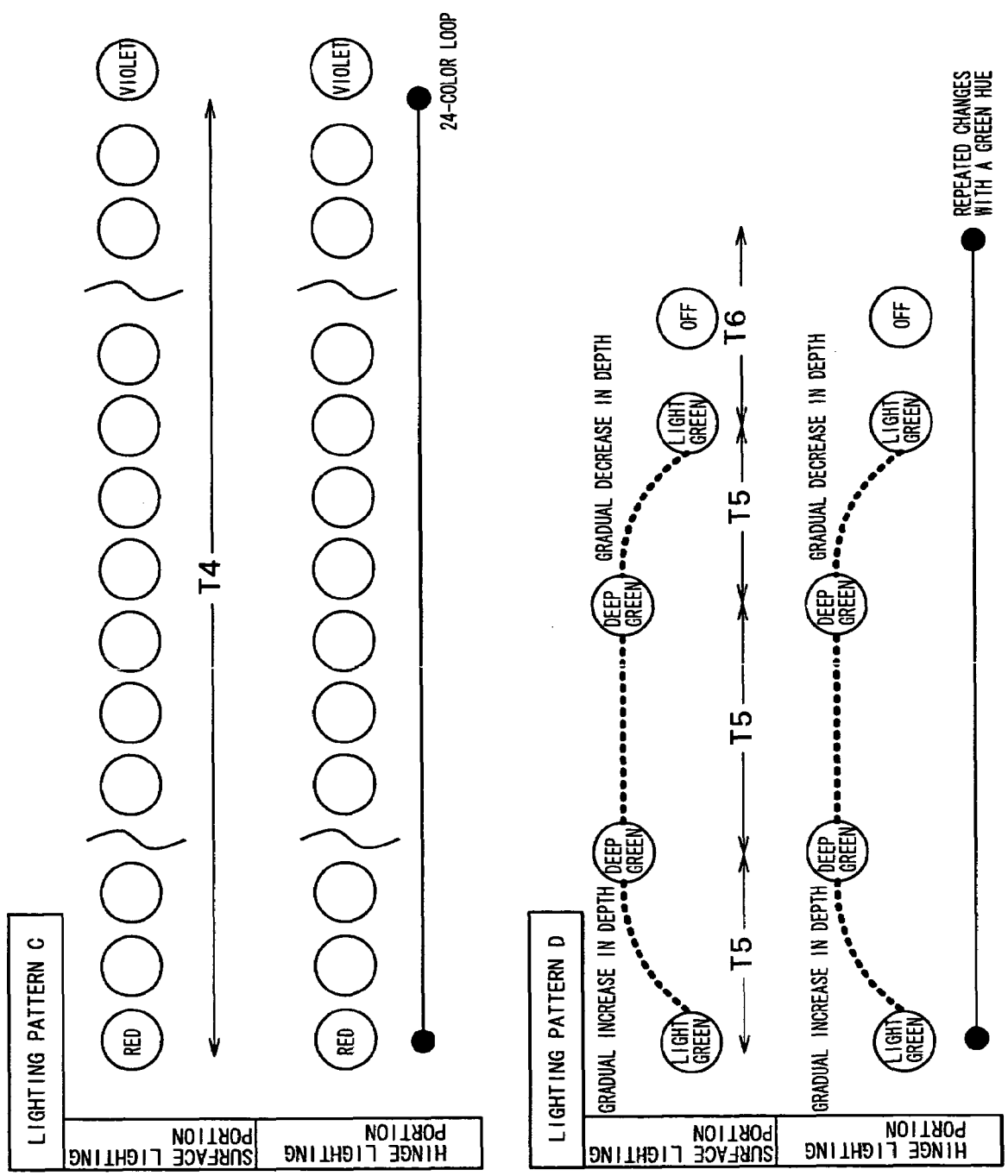

PORTABLE TERMINAL APPARATUS

BACKGROUND OF THE INVENTION

The present invention relates to a portable terminal apparatus such as a mobile phone.

In general, the notification of incoming calls in a mobile phone is made by means of ringer tone produced by a speaker, vibration produced by a vibrator, or light emitted from a light emitting diode (LED). A suitable one of these methods is selected by a user. For example, in public places such as in a train, the notification method is switched from the ringer tone to the vibration or light in many cases unless the mobile phone is powered off.

Recently, the mobile phone has become widespread and it has been used by many people regardless of age or sex. For example, there is a case that the mobile phone is owned by a person having relatively poor hearing. In this case, it is desirable to more effectively make the notification of incoming calls by means of the vibration or light in addition to or instead of the ringer tone. Further, in the case that a person having relatively poor eyesight also intends to use the light for the notification of incoming calls, it is desirable to more effectively make the notification by means of the light. Further, it is desirable for young people that a more effective illumination form can be provided from the viewpoints of decoration and fashion aside from the notification of incoming calls. Conventionally, such illumination is applied to a greatly limited portion such as the tip of a whip antenna. Further, although the color of light for illumination can be changed, the manner of illumination cannot be changed in various patterns.

Conventionally known is a foldable mobile phone such that a decorative panel can be replaceably mounted on the back side (outer side) of a liquid crystal display portion. This panel is curved so as to adapt to the external shape of the mobile phone, and has a locking pawl for use in replacement of the panel. Thus, the panel has a relatively complicated shape. While various panels may be prepared as an option by the related makers, there is a problem that the cost of the various panels is high because of their complicated shapes.

SUMMARY OF THE INVENTION

It is an object of the present invention to provide a portable terminal apparatus having a novel surface lighting portion which can appeal to user's vision intensively and variously.

It is another object of the present invention to provide a portable terminal apparatus having a communication function which can effectively make the notification of incoming calls or the like by means of light.

In accordance with an aspect of the present invention, there is provided a portable terminal apparatus including a housing; a surface lighting portion provided on the outer surface of the housing; and a panel member detachably mounted on the housing so as to cover the surface lighting portion, at least a part of the panel member being transparent or semitransparent.

The surface lighting portion is illuminated over the surface thereof. The light emerging from the surface lighting portion is transmitted through the panel member at least of which is transparent or semitransparent, and the transmitted light from the panel member is visible. Accordingly, in the case that the whole of the panel member is transparent, the emergent light from the surface lighting portion is entirely transmitted through the panel member, whereas in the case that the panel member has a pattern (inclusive of a color pattern), surface light emission is obtained from the panel member according to the pattern of the panel member. In other words, the illuminated condition of only the surface lighting portion can be modified by the panel member. The color of the pattern of the panel member itself is determined only by ambient light reflected on the panel member. However, by directing the emergent light from the surface lighting portion to the panel member, the transmitted light from the panel member contributes to the color of the pattern of the panel member. Accordingly, by switching between the on and off states of the surface lighting portion located behind (under) the panel member, the illuminated condition of the pattern can be varied. Further, also by changing the color of the emergent light from the surface lighting portion, the illuminated condition of the pattern can be varied in combination with the color of the pattern.

Preferably, the surface lighting portion has a flat outer surface; the panel member includes a flat plate like member; and the housing has means for holding the flat plate like member placed on the flat outer surface of the surface lighting portion. Accordingly, the panel member is not required to have any special functional portions such as a locking pawl and therefore to perform a forming process therefore.

In the case that the apparatus has a communication function, the whole of the surface lighting portion is illuminated upon receiving an incoming call, so as to use the surface lighting portion for the notification of incoming calls. Accordingly, the visibility can be improved to thereby more effectively make the notification of incoming calls.

Preferably, the surface lighting portion includes a light source and a light guiding plate for guiding light emitted from the light source and scattering the light from one surface. However, the configuration of the surface lighting portion is not limited to this configuration, but any other arbitrary means or members for surface light emission maybe used.

Preferably, the portable terminal apparatus further includes means for changing a lighting pattern provided by the surface lighting portion according to a caller upon receiving an incoming call. With this configuration, when receiving an incoming call from a caller whose phone number is preliminarily recorded in a phone directory, the lighting pattern preliminarily allocated to the specific caller can be selected.

Preferably, the panel member includes a plurality of panel members adapted to be selectively mounted on the housing, each of the panel members having information for specifying the lighting pattern; the apparatus further including means for detecting the information and means for controlling the lighting portion according to the information detected by the detecting means. Accordingly, only by replacing the panel member with another one, the lighting portion corresponding to the other panel member can be automatically selected.

In accordance with another aspect of the present invention, there is provided a portable terminal apparatus having a communication function, including an upper housing; a lower housing; a hinge portion for pivotably connecting the upper housing and the lower housing so that the upper housing is foldable with respect to the lower housing; a hinge lighting portion provided at the hinge portion for illumination in the condition where the upper housing is folded with respect to the lower housing; a surface lighting portion provided on the outer surface of the upper housing; and control means for controlling lighting patterns of the hinge lighting portion and the surface lighting portion independently and selectively. This portable terminal apparatus has the hinge lighting portion provided at the hinge portion in addition to the surface lighting portion, and the lighting patterns of the hinge lighting portion and the surface lighting portion can be controlled independently and selectively. Accordingly, these two lighting portions can be used in organic combination.

Preferably, the control means includes means for variably controlling the lighting patterns of the hinge lighting portion and the surface lighting portion according to an event occurring in the apparatus. In this case, the event may includes at least two of calling, speaking, and charging.

Preferably, the control means comprises means for changing the lighting patterns of at least the surface lighting portion according to a caller upon receiving an incoming call. In this case, the lighting pattern of the hinge lighting portion may be combined with the lighting pattern of the surface lighting portion.

Preferably, the control means includes means for variably controlling the lighting patterns of the hinge lighting portion and the surface lighting portion according to a user instruction.

Preferably, the hinge lighting portion has a semicylindrical light guiding member at the hinge portion, so that light emerging from the hinge lighting portion is visible in a direction parallel to the outer surface of the surface lighting portion at least in the folded condition of the upper housing. More preferably, the light emerging from said hinge lighting portion is visible also in a direction perpendicular to the outer surface of the surface lighting portion. Accordingly, the viewing angle of the hinge lighting portion can be enlarged as compared with the related art, thereby improving the usage value in the notification of incoming calls by means of light.

Other objects and features of the invention will be more fully understood from the following detailed description and appended claims when taken with the accompanying drawings.

BRIEF DESCRIPTION OF THE DRAWINGS

FIGS. 8A and 8B are sectional views showing a mechanism for realizing the operation shown in FIG. 7;

FIGS. 9A and 9B are views similar to FIGS. 8A and 8B, showing another mechanism;

FIGS. 12A to 12B are schematic illustrations of four kinds of lighting patterns of the surface lighting portion and the hinge lighting portion in combination;

DETAILED DESCRIPTION OF THE PREFERRED EMBODIMENTS

A preferred embodiment of the present invention will now be described in detail with reference to the drawings. In the following description, the present invention is applied to a mobile phone as an example of the portable terminal apparatus.

Figure 1:
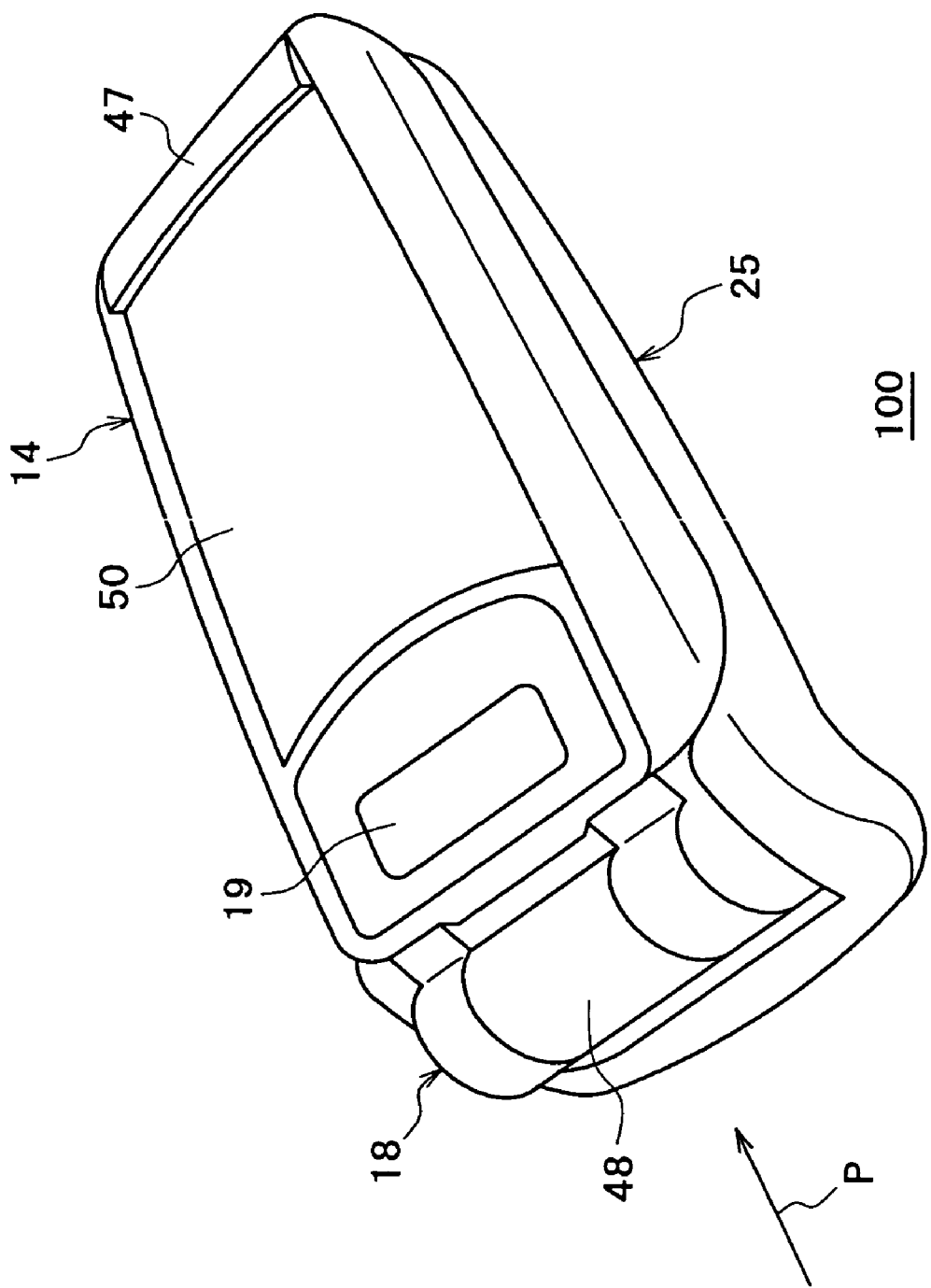
FIG. 1 is a perspective view showing the appearance of a mobile phone according to a preferred embodiment of the present invention.

FIG. 1 is a perspective view showing the appearance of a mobile phone 100 according to a preferred embodiment of the present invention. The mobile phone 100 is a foldable mobile phone such that an upper housing 14 and a lower housing 25 are pivotably connected through a hinge portion 18. A detachable panel member 50 and a sub-display portion 19 are provided on the outer surface of the upper housing 14, that is, on the backside of a main display portion (which will be hereinafter described). The sub-display portion 19 may be used for the display of radio wave condition, date and time, battery level, etc.

A hinge lighting portion 48 is provided at a fixed part of the hinge portion 18, that is, at a central nonrotational part of the hinge portion 18 as shown. The panel member 50 is formed from a flat plate like member having at least a transparent or semitransparent part. The panel member 50 is mounted so as to cover a light emission surface of a surface lighting portion (which will be hereinafter described) provided under the panel member 50.

Figure 2:
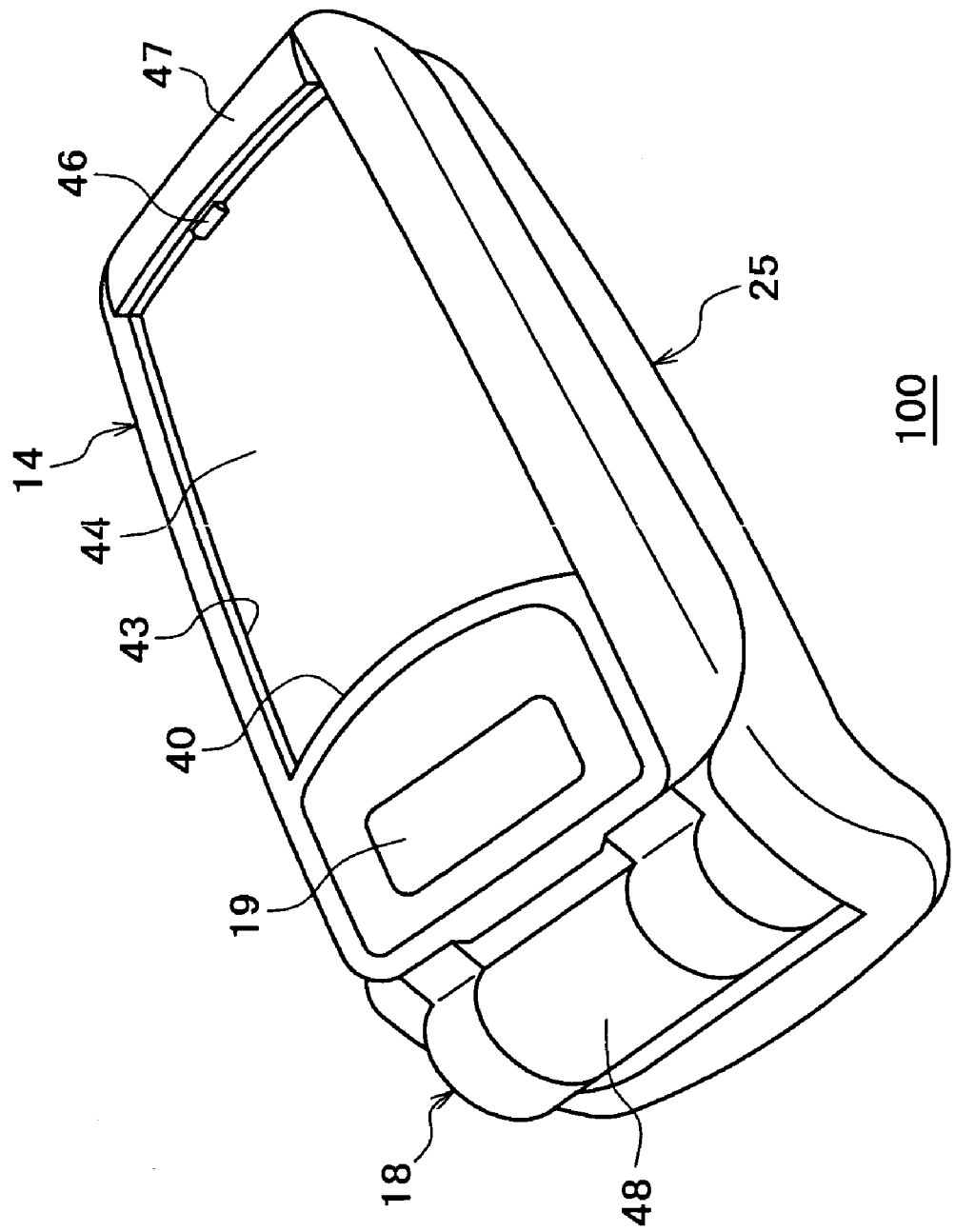
FIG. 2 is a view similar to FIG. 1, showing the condition where a panel member has been removed from the mobile phone.
Figure 3:
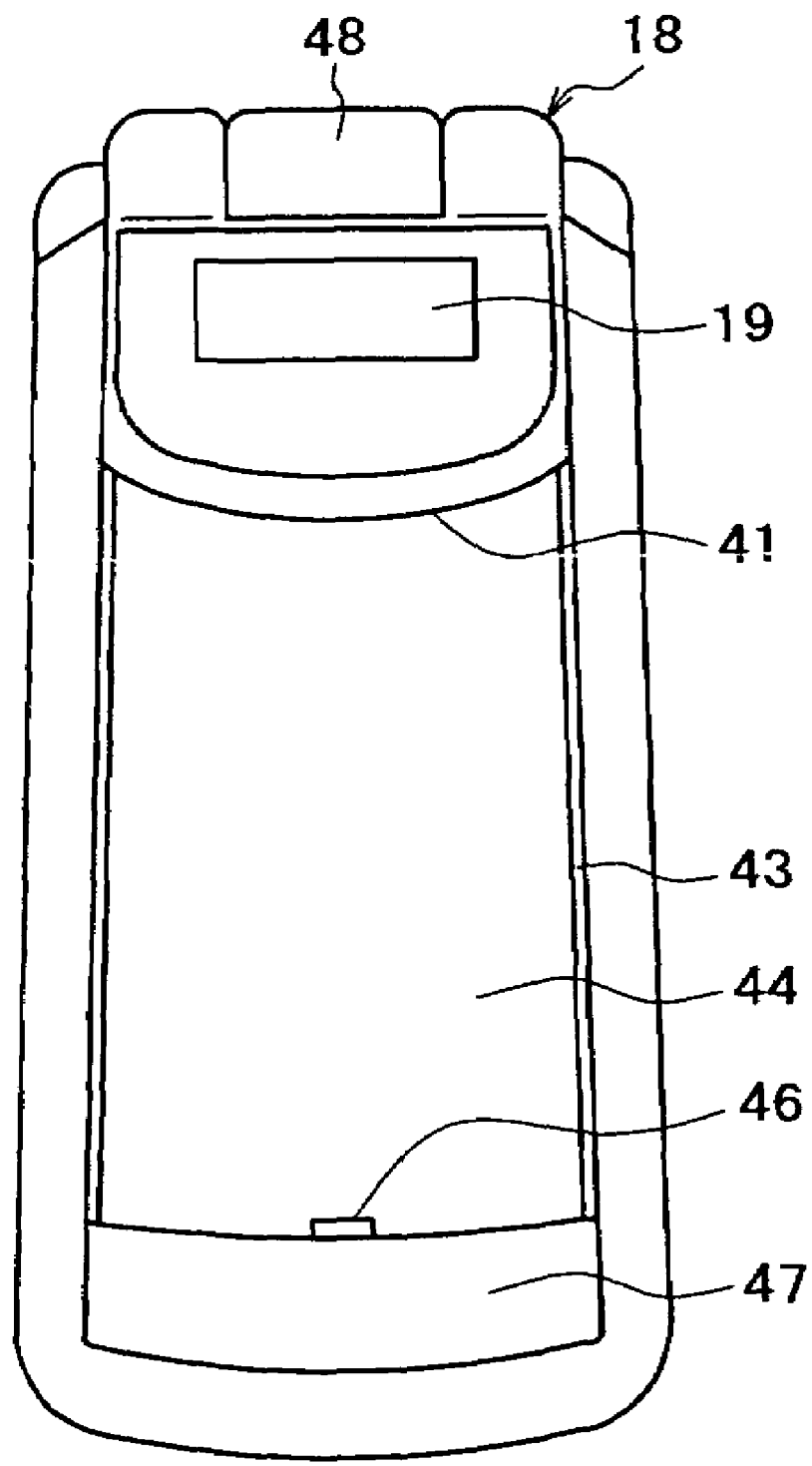
FIG. 3 is a top plan view of the mobile phone shown in FIG. 2.

FIG. 2 shows a condition where the panel member 50 has been removed from the mobile phone 100 shown in FIG. 1. FIG. 3 is a plan view of the mobile phone 100 in this condition. A surface lighting portion 44 having a flat upper surface as a light emission surface is provided at a position when the panel member 50 has been present. The upper surface of the surface lighting portion 44 is lower in level than a peripheral portion of the upper housing 14, so as to define a recess for accommodating the panel member 50. That is, a pair of wall-like guides 43 each having a height slightly larger than the thickness of the panel member 50 are formed along the opposite sides (the right and left sides as viewed in FIG. 3) of the surface lighting portion 44. These guides 43 function to position the panel member 50 in mounting it into the above recess. A groove 41 for receiving the front end of the panel member 50 (the upper end as viewed in FIG. 3 on the hinge portion 18 side) is formed on the upper housing 14 at a position corresponding to the front end of the surface lighting portion 44 (the upper end as viewed in FIG. 3 on the hinge portion 18 side). The groove 41 is concave on the hinge portion 18 side as viewed in FIG. 3, and it functions as means for locking the front end of the panel member 50. A pressure member 46 retractably projects upward from the upper surface of the surface lighting portion 44 at the rear end thereof (on the side opposite to the hinge portion 18). Further, a slide member (movable locking member) 47 is provided at a rear end portion of the upper housing 14 in the vicinity of the pressure member 46. The slide member 47 is supported to the upper housing 14 so as to be slidable in a given range in a direction along the guides 43, and is normally biased toward the front end of the upper housing 14 (toward the hinge portion 18) by an elastic force applied to the slide member 47. Accordingly, in placing the panel member 50 on the surface lighting portion 44 and fixing (locking) the panel member 50 to the upper housing 14, the front end of the panel member 50 is first fitted into the groove 41, and the slide member 47 is next slid toward the rear end opposite to the hinge portion 18. In this condition, the rear end portion of the panel member 50 is depressed to push down the pressure member 46 against an elastic force applied thereto and to thereby closely mount the panel member 50 on the surface lighting portion 44. In this condition, the sliding force applied to the slide member 47 is removed to return the slide member 47 to its original position by the elastic force. As a result, the rear end portion of the panel member 50 is locked the front end portion of the slide member 47 on the hinge portion 18 side in an overlying manner, thereby obtaining a locked condition of the panel member 50. Thus, the panel member 50 is prevented from falling from the upper housing 14. The pressure member 46 functions to eliminate a play of the panel member 50 in its locked condition. Particularly in the case that the depth of the recess for mounting the panel member 50 is set sufficient so as to allow a sheet like (or card like) member be sandwiched between the surface lighting portion 44 and the panel member 50, there is a possibility that when such a sheet like member is not applied, the panel member 50 may play in a direction perpendicular to its surface unless the pressure member 46 is provided. Accordingly, the pressure member 46 can effectively function to suppress such a play of the panel member 50. Such a mechanism is clearly shown in FIG. 8A as will be hereinafter described.

Figure 4:
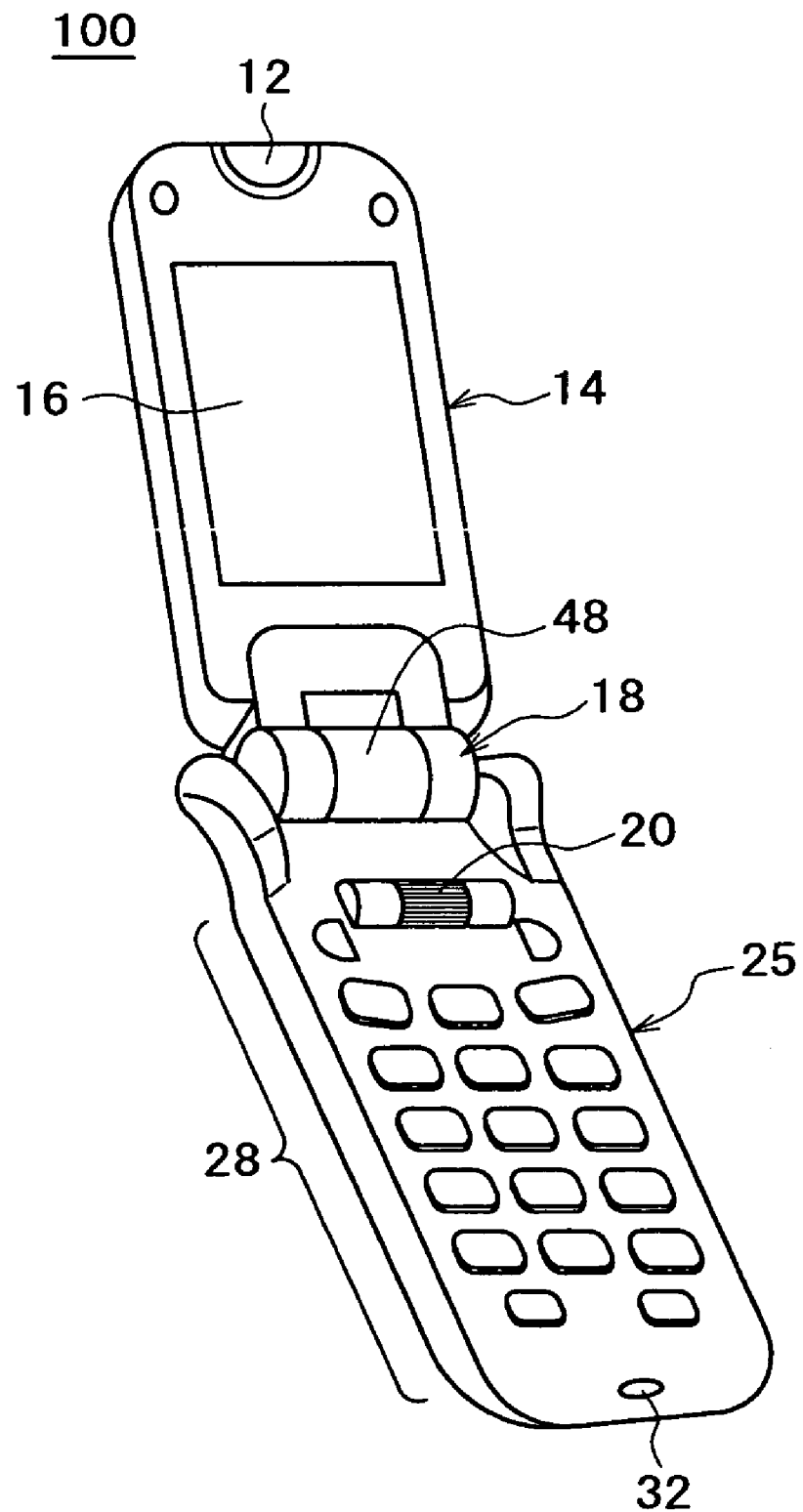
FIG. 4 is a perspective view showing the appearance of the mobile phone in the condition where an upper housing is open.

FIG. 4 is a perspective view showing the appearance of the mobile phone 100 in the condition where the upper housing 14 is open. As apparent from FIG. 4, a main display portion 16 such as a liquid crystal display device is provided at a main portion on the inside surface of the upper housing 14, and a speaker portion 12 is provided on the inside surface of the upper housing 14 at the rear end thereof (at the upper end as viewed in FIG. 4). Further, a jog dial 20 and various operation keys 28 to be operated by a user are provided over the inside surface of the lower housing 25, and a microphone portion 32 is provided on the inside surface of the lower housing 25 at the rear end thereof (at the lower end as viewed in FIG. 4). As will be hereinafter described in detail, it should be noted that the hinge lighting portion 48 formed at the hinge portion 18 is visible even in the open condition of the upper housing 14.

Figure 5:
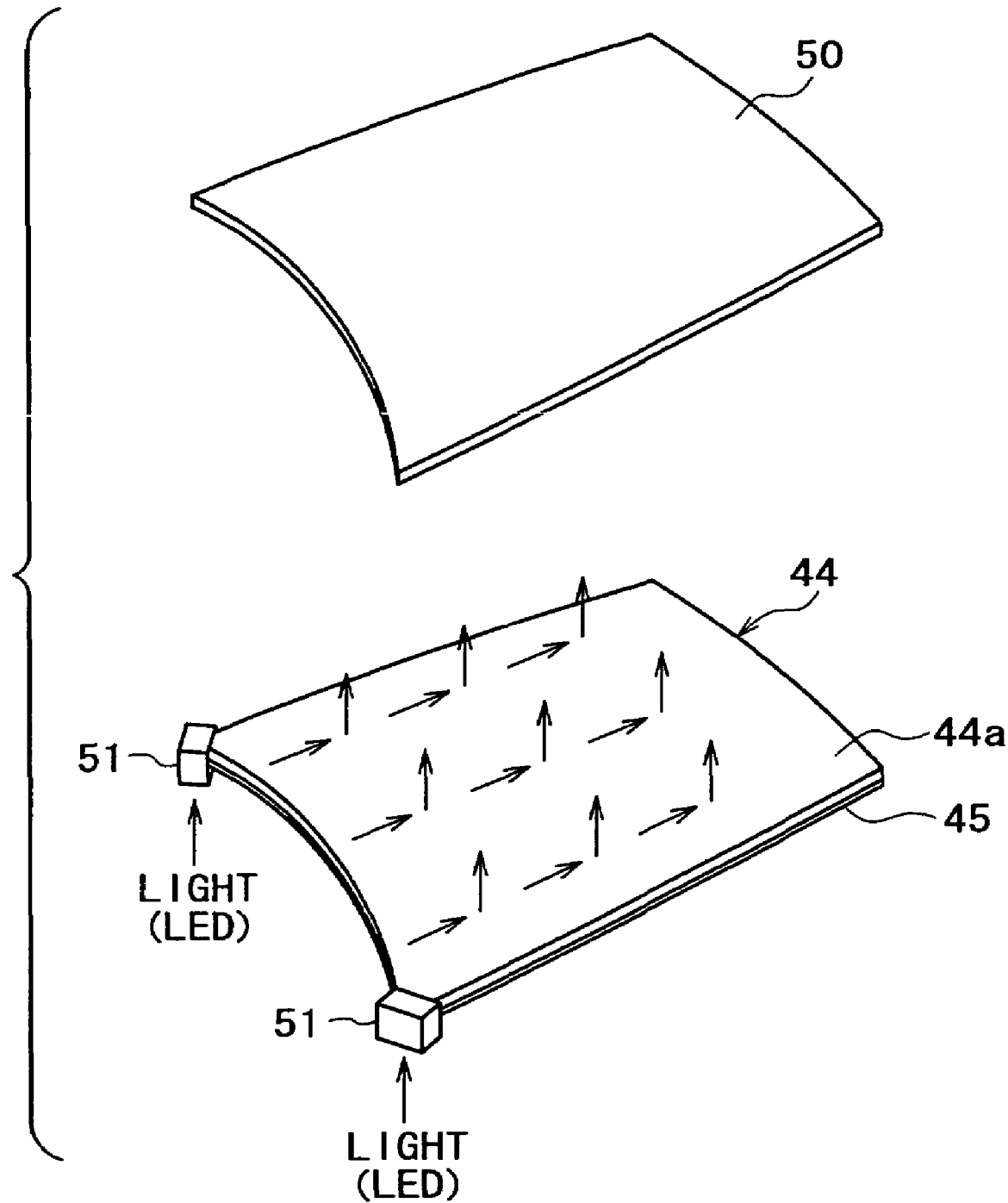
FIG. 5 is a perspective view showing the configurations of the panel member and a surface lighting portion provided under the panel member.

FIG. 5 shows the configurations of the panel member 50 and the surface lighting portion 44 in perspective. As mentioned above, the panel member 50 is formed from a flat plate like member transparent or semitransparent at least a part thereof. The surface lighting portion 44 is composed of two optical path converting elements 51 such as prisms for converting the optical paths of light emitted from two light sources (e.g., light emitting diodes (LEDs) in this preferred embodiment), a substantially rectangular light guiding plate 44a having adjacent acute corner portions to which the optical path converting elements 51 are connected, and a substantially rectangular reflecting plate 45 mounted on the lower surface of the light guiding plate 44a. In the case that the light from the light sources can be introduced directly to the light guiding plate 44a, the optical path converting elements 51 maybe omitted. In this preferred embodiment, each light source is provided by a set of RGB color LEDs, wherein the light intensity of each color can be variably controlled, thereby realizing multicolor light emission. The light guiding plate 44a is a flat plate like member formed of a light transmitting material and having substantially the same shape as that of the panel member 50. The lower surface of the light guiding plate 44a has a fine pattern for scattering of light. The reflecting plate 45 is a white sheet like member and functions to upward reflect the vertically downward light scattered from the light guiding plate 44a. The surface lighting portion usable in the present invention is not limited to such a structure, but a color display device using EL (Electroluminescence), for example, may be adopted.

The panel member 50 has a front edge concave on the hinge portion 18 side. Although this structure is not essential, the following merits can be exhibited by this structure. That is, the front and rear sides of the panel member 50 can be distinguished from each other; the light from the two light sources can be efficiently introduced into the light guiding plate 44a; and the area of the panel member 50 can be enlarged as retracting from the region for the sub-display portion 19.

Figure 6A:
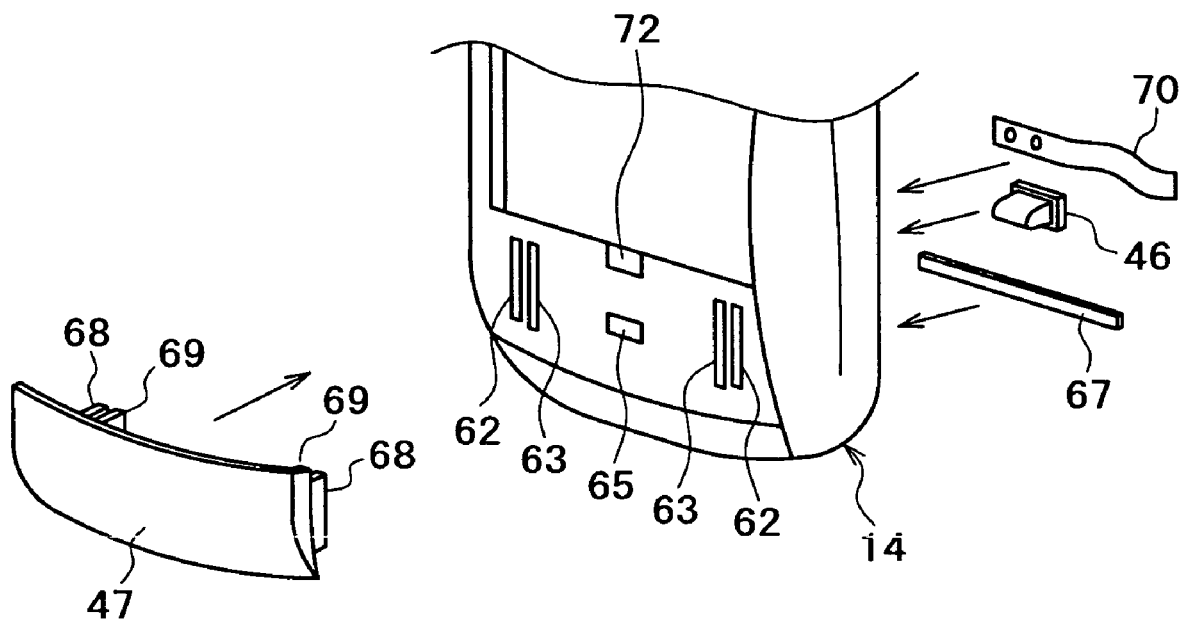
FIG. 6A is an exploded perspective view for illustrating a mechanical structure related to a slide member mounted on the upper housing.

FIG. 6A is an exploded perspective view for illustrating a mechanical structure related to the slide member 47. The upper housing 14 is formed at its rear end portion (lower end portion as viewed in FIG. 6A) with two pairs of slits 62 and 63 extending longitudinally (in the longitudinal direction of the upper housing 14). The slide member 47 is a laterally extending member having a slightly curved outer surface. The slide member 47 is formed with two pairs of longitudinally extending projections 68 and 69 respectively slidably inserted through the two pairs of slits 62 and 63. The projections 68 and 69 project from the inner surface of the slide member 47. When the slide member 47 is mounted on the upper housing 14 so that the projections 68 and 69 are respectively inserted through the slits 62 and 63, pawl portions formed on the outer side surfaces of the projections 68 come into lock the side edges of the slits 62. Accordingly, the slide member 47 is prevented from falling from the upper housing 14. In removing the slide member 47 from the upper housing 14, the opposed projections 68 and 69 of each pair is flexibly deformed toward each other and the pawl portions are unlocked from the slits 62. In this condition, the projections 68 and 69 are pushed from the back side of the upper housing 14. The upper housing 14 is further formed with a through hole 72 for insertion of the pressure member 46. A leaf spring 70 is provided on the back side of the upper housing 14, so as to apply a pressure to the pressure member 46. An elastic pin (elastic member) 67 is also provided on the back side of the upper housing 14, so as to apply a biasing force to the slide member 47 toward the front end of the upper housing 14 (toward the hinge portion 18). Thus, the elastic pin 67 functions as biasing means for normally biasing the slide member 47 toward the hinge portion 18. A through hole 65 is formed at the rear end portion (lower end portion as viewed in FIG. 6A) of the upper housing 14 at a position below the through hole 72, so as to assist mounting of the elastic pin 67 to be hereinafter described.

Figure 6B:
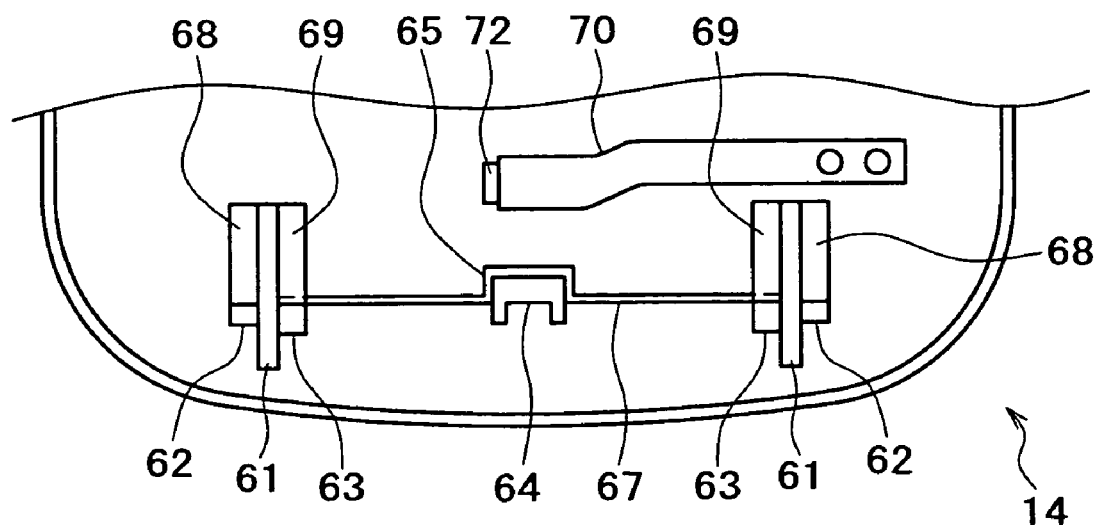
FIG. 6B is an enlarged plan view showing the mechanical structure shown in FIG. 6A as viewed from the back side of the upper housing.

FIG. 6B shows the back side of the rear end portion of the upper housing 14 shown in FIG. 6A. As apparent from FIG. 6B, the tips of the projections 68 and 69 inserted through the slits 62 and 63 are shown. A pair of lugs 61 are formed on the inner surface of the upper housing 14 so that each lug 61 is positioned between the slits 62 and 63 of each pair in order to guide the projections 68 and 69 in sliding the slide member 47. A projection 64 is formed near the through hole 65, and the elastic pin 67 is fixed at its central portion to the projection 64. The opposite ends of the elastic pin 67 are engaged with the rear ends of the projections 69 (the lower ends as viewed in FIG. 6B). Accordingly, the projections 68 and 69 are normally biased toward the front ends of the slits 62 and 63 (the upper ends as viewed in FIG. 6B) (toward the hinge portion 18) by the elastic force of the elastic pin 67. When a rearward force is applied to the slide member 47 by the user's thumb, for example, in a direction away from the hinge portion 18, the slide member 47 is slid rearward against the elastic force of the elastic pin 67. When this rearward force by the user's thumb is removed from the slide member 47, the slide member 47 is frontward returned to its original position by the elastic force of the elastic pin 67. The leaf spring 70 is fixed at one end thereof to the upper housing 14, and one surface of the leaf spring 70 at its other free end normally applies an elastic force to the pressure member 46 to project the pressure member 46 from the through hole 72.

Figure 7:
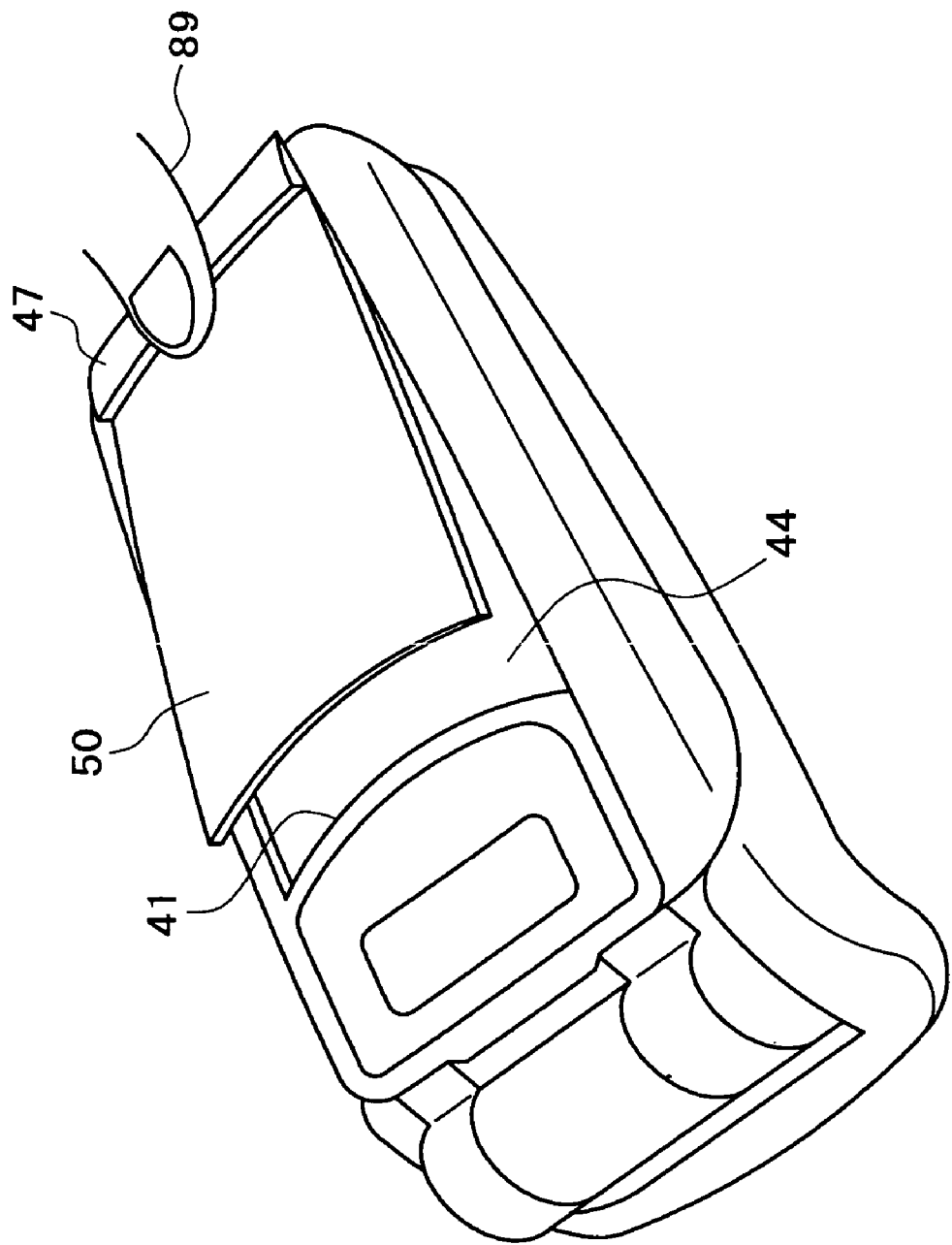
FIG. 7 is a perspective view for illustrating a user operation in removing the panel member from the upper housing.

The user operation in removing the panel member 50 from the upper housing 14 will now be described with reference to FIGS. 7 to 9B. FIG. 7 is a perspective view of the mobile phone 100 in removing the panel member 50. FIGS. 8A and 8B are sectional views showing a mechanism for realizing the operation of removing the panel member 50, wherein FIG. 8A shows a locked condition of the panel member 50 and FIG. 8B shows a condition where the user operation is being performed in removing the panel member 50. In FIGS. 8A and 8B, the ratio between the thickness and length of each of the panel member 50 and the surface lighting portion 44 is different from an actual ratio, but the thickness shown is larger than an actual thickness for convenience. The mobile phone 100 in its folded condition is held by one of the user's hands, and a contact pressure (or frictional force) is applied to the rear end portion of the panel member 50 by the thumb 89, for example, of the other user's hand. In this condition, the slide member 47 is slid toward the rear end of the upper housing 14 in a direction away from the hinge portion 18 by the thumb 89, so that the concave front end of the panel member 50 is disengaged from the groove 41. At the same time, the front end of the slide member 47 on the hinge portion 18 side is retracted, so that a depression force of the slide member 47 applied through the panel member 50 to the pressure member 46 is reduced. As a result, the tip of the pressure member 46 depressed by the panel member 50 projects vertically upward from the through hole 72 (see FIGS. 6A and 6B), thereby lifting the concave front end of the panel member 50 from the surface lighting portion 44 as shown in FIG. 8B. In this condition, the panel member 50 can be easily removed.

The panel member 50 has a simple flat shape and it is fitted with the recess on the surface lighting portion 44. Accordingly, such lifting of the concave front end of the panel member 50 is very convenient in removing the panel member 50.

FIGS. 9A and 9B show another mechanism for lifting the front end of the panel member 50 in the case that the pressure member 46 is not provided. When the slide member 47 is retracted from the locked condition of the panel member 50 shown in FIG. 9A, the front end of the panel member 50 (the left end as viewed in FIG. 9A) is unlocked from the groove 41, and the rear end of the panel member 50 (the right end as viewed in FIG. 9A) is pushed down by a depression force applied by the user's thumb to enter a recess 99 formed at the rear end of the surface lighting portion 44 (the right end as viewed in FIG. 9B), so that the front end of the panel member 50 is lifted.

The mechanism itself for attaching and detaching the panel member 50 as described with reference to FIGS. 6A to 9B does not require a communication function, but can be applied to any arbitrary apparatus in which a plate like panel member is detachably mounted.

Figure 10:
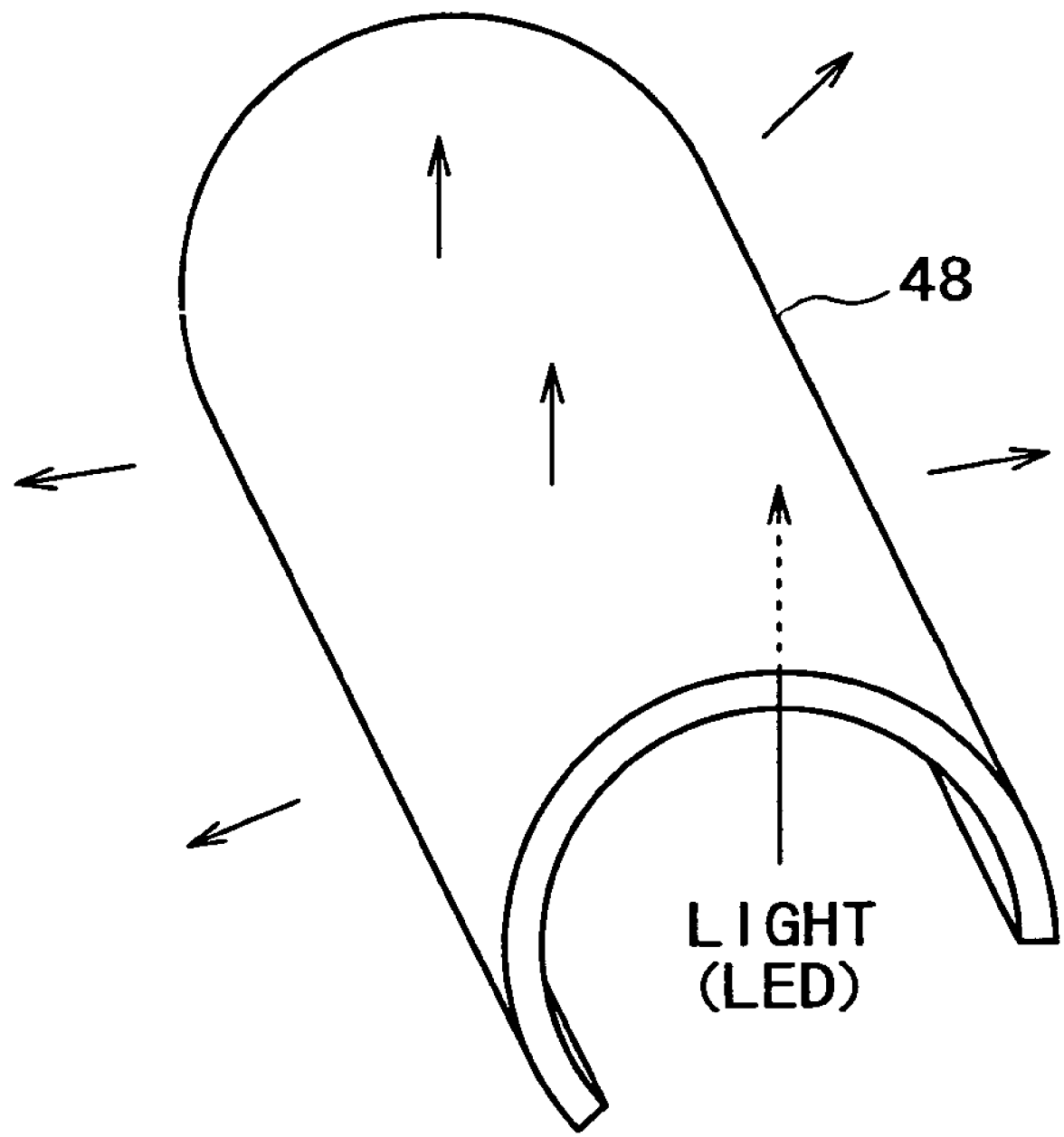
FIG. 10 is a perspective view showing the configuration of a hinge lighting portion.

FIG. 10 shows the configuration of the hinge lighting portion 48 in perspective. The hinge lighting portion 48 is a semicylindrical light guiding member, and light emitted from a light source such as an LED is introduced from a part of this light guiding member. A plurality of light sources for the hinge lighting portion 48 may be provided. The number of light sources is not especially limited. With this structure of the hinge lighting portion 48, the light emerging from the hinge lighting portion 48 spreads circumferentially. Accordingly, the light emerging from the hinge lighting portion 48 is visible in a direction parallel to the outer surface of the surface lighting portion 44 in the closed condition of the upper housing 14, that is, in a direction depicted by an arrow P in FIG. 1. Further, the emergent light is also visible in a direction perpendicular to the direction P. The visibility of the emergent light from the hinge lighting portion 48 in the direction P is advantageous because when the hinge lighting portion 48 is used for the notification of incoming calls in such a condition that the mobile phone 100 is carried in a breast pocket, for example, with the hinge portion 18 directed upward, the emergent light from the hinge lighting portion 48 is visible from the upper opening of the breast pocket.

Such a function similar to that of the hinge lighting portion 48 is disclosed in Japanese Patent Laid-open No. 2002-64599. This preferred embodiment is characterized by the use of the hinge lighting portion 48 and the surface lighting portion 44 in combination as will be hereinafter described in detail.

Figure 11:
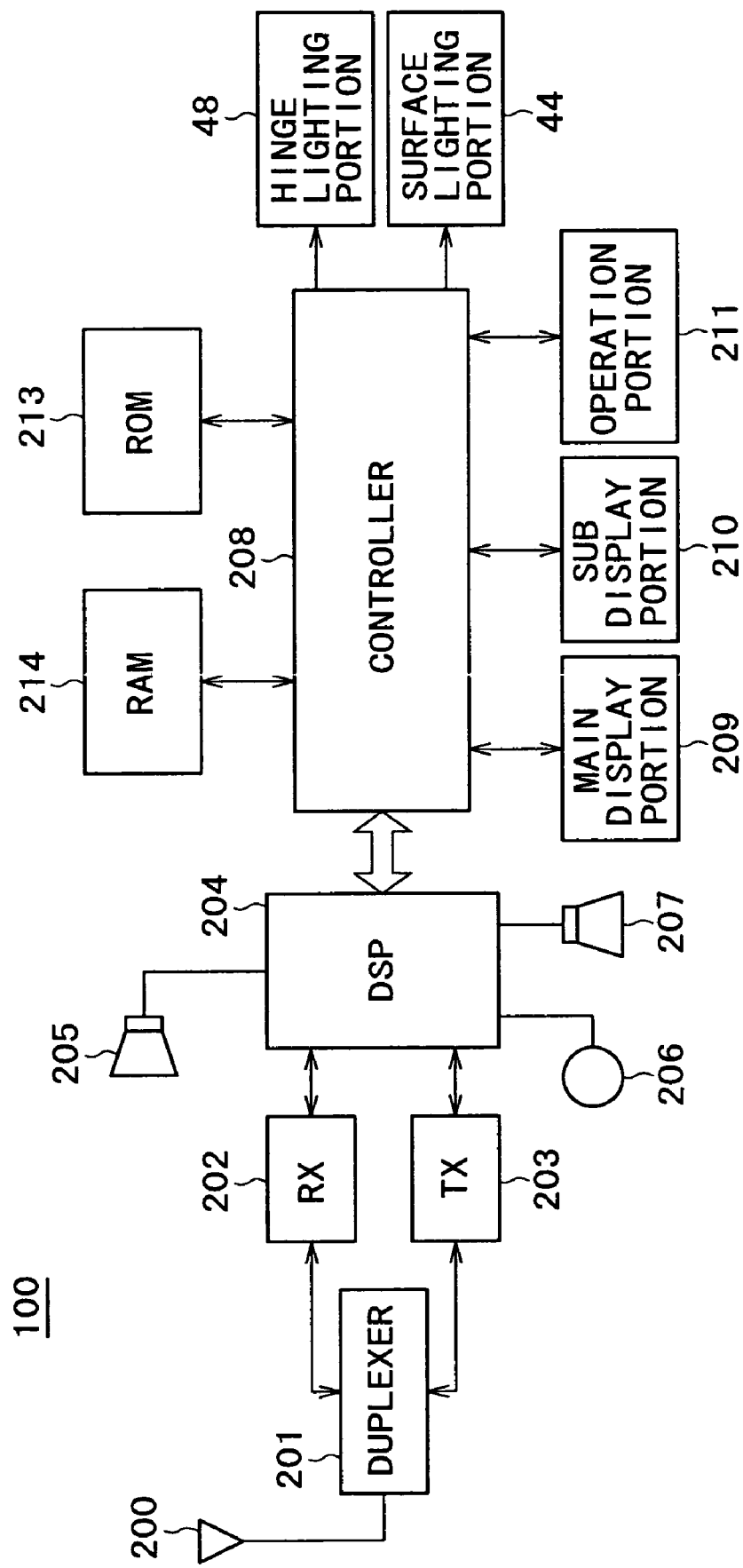
FIG. 11 is a block diagram showing the hardware configuration of the mobile phone.

FIG. 11 shows the hardware configuration of the mobile phone 100. The mobile phone 100 comprises an antenna 200, duplexer 201, receiver (RX) 202, transmitter (TX) 203, DSP (Digital Signal Processor) 204, speaker 205, microphone 206, and ear receiver 207. These components are related to a phone function. The mobile phone 100 further includes a controller 208, main display portion 209 (corresponding to the component 16 shown in FIG. 4), sub-display portion 210 (corresponding to the component 19 shown in FIG. 2), operating portion 211 (corresponding to the components 20 and 28 shown in FIG. 4), ROM 213, RAM 214, the surface lighting portion 44, and the hinge lighting portion 48. These components are related to the control of the mobile phone 100. The surface lighting portion 44 and the hinge lighting portion 48 include LEDs as mentioned above. The ROM 213 preliminarily stores a control program for realizing an operation to be hereinafter described. The ROM 213 may include a programmable memory such as a flash ROM.

FIG. 12 shows four kinds of lighting patterns A, B, C, and D of the surface lighting portion 44 and the hinge lighting portion 48 in combination. The lighting pattern A is such that the surface lighting portion 44 is controlled to emit yellow light during a given time period T1 (e.g., several seconds) whose depth is gradually increased from zero to a maximum depth and next gradually decreased from the maximum depth to zero, whereas the hinge lighting portion 48 is controlled to emit yellow light during the time period T1 whose depth is kept constant. According to this pattern, the emergent light from the surface lighting portion 44 is slowly changed in depth from light yellow through deep yellow to light yellow during a relatively long time as deep breathing. The lighting pattern B is such that the surface lighting portion 44 is controlled to emit cyan light during a given time period T2 whose depth is gradually increased from zero to a maximum depth, next during a given time period T3 whose depth is kept at the maximum depth, and next during the time period T2 whose depth is gradually decreased from the maximum depth to zero, whereas the hinge lighting portion 48 is controlled to emit cyan light to blue light of nine different depths during the overall time period of T2+T3+T2. This change from cyan light to blue light is repeated. According to this pattern, the emergent light from the surface lighting portion 44 is gradually changed from light cyan to deep cyan with repetition like waving. The lighting pattern C is such that both the surface lighting portion 44 and the hinge lighting portion 48 are controlled to emit rainbow-colored light during a given time period T4 wherein the component colors are sequentially changed. According to this pattern, the emergent light is changed from red through orange, yellow, green, and blue to violet, thereby obtaining an image like a rainbow. The lighting pattern D is such that both the surface lighting portion 44 and the hinge lighting portion 48 are controlled to emit green light during a given time period T5 whose depth is gradually increased from a minimum depth to a maximum depth, next during the time period T5 whose depth is kept at the maximum depth, next during the time period T5 whose depth is gradually decreased from the maximum depth to the minimum depth, and next during a given time period T6 whose depth is kept zero. According to this pattern, the emergent light is changed with a green hue, thereby obtaining an image like nature, forest, etc.

The term of "lighting pattern" used in this specification means any arbitrary combination of the emergent light colors from the surface lighting portion and the hinge lighting portion and of the on and off states of the surface lighting portion and the hinge lighting portion.

The lighting patterns shown in FIG. 12 are merely illustrative, and the color, time period, sequence, etc. are not limited to those mentioned above. For example, other conceivable lighting patterns may include a lighting pattern such that various colors are quickly changed at random like graffiti, a lighting pattern such that complementary colors such as red and green are alternately changed to provide a striking image, and a lighting pattern such that such changing of colors is suddenly stopped to come into an off state.

Further, it is possible to provide different lighting impressions with the same lighting pattern according to the configuration (color and transmissivity) of the panel member. For example, by combining the pattern formed on the panel member and the lighting pattern of the surface lighting portion, a new pattern is made visible.

While the surface lighting portion and the hinge lighting portion are simultaneously operated in the example shown in FIG. 12, one of the surface lighting portion and the hinge lighting portion may be operated.

Further, the lighting pattern as the notification of incoming calls may be changed by preliminarily making the panel member itself have information on the lighting pattern and only changing the panel member. In this case, the panel member may have encoded shape changes such as projections, recesses, and slits or encoded electrical contacts in combination. By using such combination of electrical contacts and identifying each of individual panel members (or the kind thereof) by means of a detector provided in the body of the mobile phone, the lighting pattern of at least the surface lighting portion can be specified according to the panel member (or the kind thereof) mounted on the body of the mobile phone.

Figure 13:
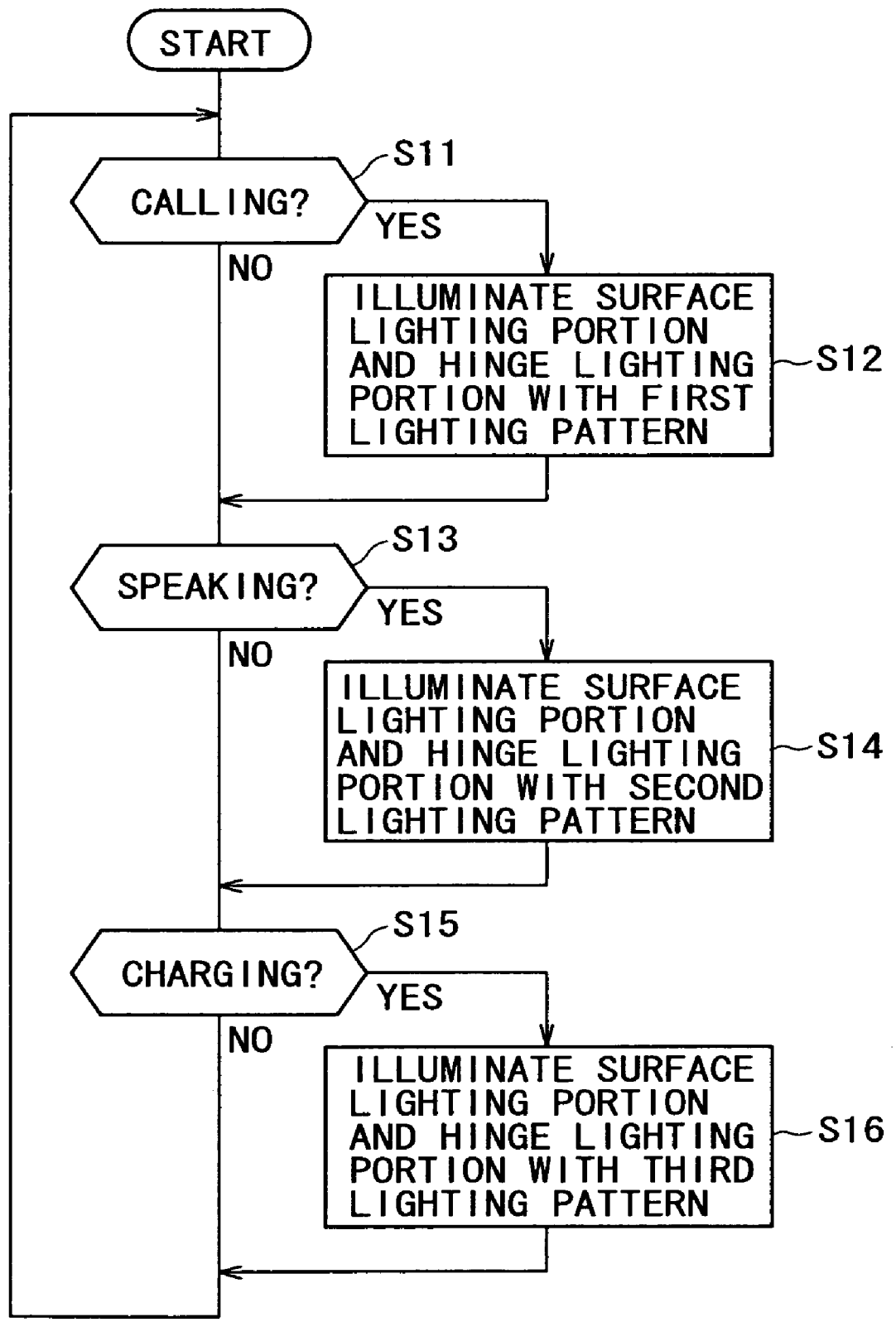
FIG. 13 is a flowchart showing an example of the control of the surface lighting portion and the hinge lighting portion according to an event occurring in the mobile phone.
Figure 14A:
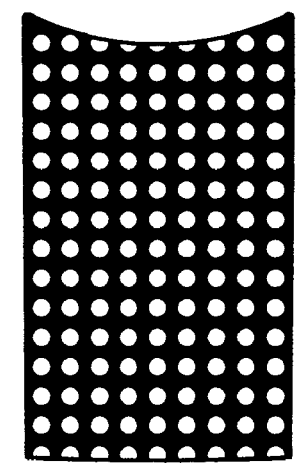
FIGS. 14A to 14F are plan views showing various patterns of the panel member.
Figure 14B:
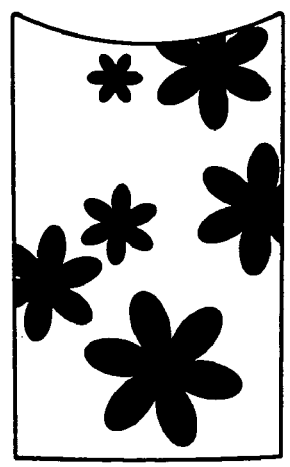
Figure 14C:
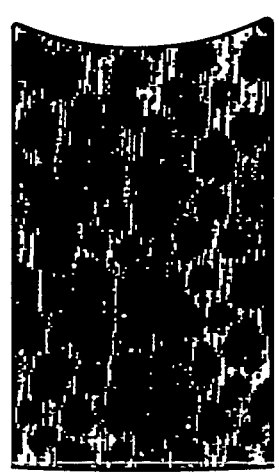
Figure 14D:
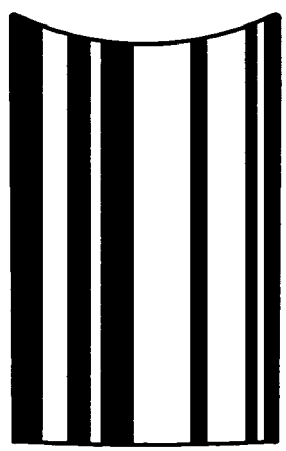
Figure 14E:
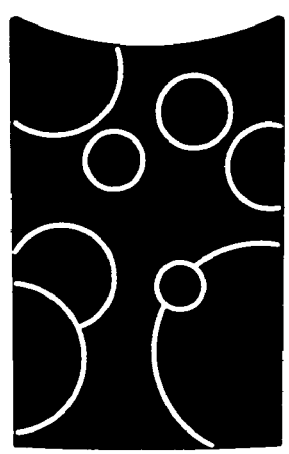
Figure 14F:
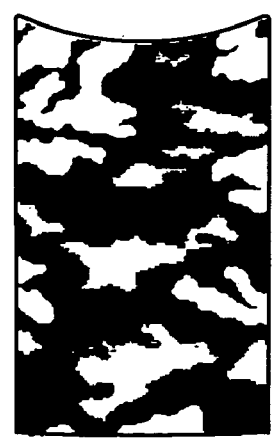

FIG. 13 is a flowchart showing an example of the control of the surface lighting portion and the hinge lighting portion according to an event occurring in the mobile phone. While the event in this example comprises three events, i.e., calling, speaking, and charging, the event does not necessarily include all of these events.

Referring to FIG. 13, when an incoming call is detected (S11, Yes), the surface lighting portion and the hinge lighting portion are illuminated with a first lighting pattern (S12). In the case of speaking (S13, Yes), the surface lighting portion and the hinge lighting portion are illuminated with a second lighting pattern (S14). In the case of charging (S15, Yes), the surface lighting portion and the hinge lighting portion are illuminated with a third lighting pattern (S16). The illumination during charging is intended not only to indicate that the battery is being charged, but also to provide enjoyment as interior illumination. In the case that the upper housing 14 is open during speaking, the illumination of the hinge lighting portion may be suppressed as another example of the control. The detection of whether or not the upper housing 14 is open may be performed by using any mechanical or optical switch known in the art (not shown).

The first, second, and third lighting patterns shown in FIG. 13 may be preliminarily set as defaults or may be variably set by the user. Further, each of the first to third lighting patterns may include a case where one of the surface lighting portion and the hinge lighting portion is not illuminated. Further, in the preferred embodiment using the surface lighting portion and the hinge lighting portion in combination, the panel member is not an essential element.

As another example of the event, the lighting pattern maybe changed according to a caller upon receiving an incoming call in the case that the caller can be identified by a caller ID service or the like. In this case, individual lighting patterns respectively corresponding to individual callers whose data have been recorded in a phone directory may also be recorded. Further, the lighting pattern for phone conversation and the lighting pattern for electronic mail may be distinguished from each other upon receiving an incoming call.

FIGS. 14A to 14F show various patterns of the panel member 50. As will be hereinafter described, arbitrary color patterns having various patterns and colors may be prepared for the panel member 50, and the user may select a desired one of these color patterns.

A part of any pattern of the panel member 50 may be made opaque, semitransparent, or transparent. For example, in a zebra pattern shown in FIG. 14D, the white-striped region maybe made transparent. Further, in a polka-dot pattern shown in FIG. 14A, the background region may be made transparent. In each case, the emergent light from the surface lighting portion located under the panel member can be transmitted through the transparent region. The black-striped region in the zebra pattern or the dot region in the polka-dot pattern may be backed by silk-screen printing to thereby completely block the emergent light from the surface lighting portion.

Further, a part of the panel member may be cut out and any material may be fitted with the cutout. For example, a rhinestone may be attached to the cutout, or a denim with an eyelet may be attached to the cutout, thereby allowing the transmission of the emergent light. In the case of the denim with the eyelet, the emergent light is transmitted through the hole of the eyelet, while in the case of the rhinestone, the emergent light is modified by the rhinestone to obtain a sparking effect.

Further, the panel member may be formed from a semitransparent mirror. In this case, by varying the transmissivity of the semitransparent mirror between the central region and the peripheral region thereof (e.g., with a gradation), the transmitted condition of the emergent light through the semitransparent mirror can be varied within the panel member even when the panel member is uniformly lit by the emergent light.

In the case that the color pattern is not backed, the emergent light can be half transmitted through the color pattern. In this case, the color pattern provided by silk-screen printing functions as a filter to absorb or transmit the light from the LED. For example, in the case of a polka-dot pattern, the dots may be colored differently to thereby provide such enjoyment that ambient light is reflected on the outer surfaces of the colored dots and the light from the LED is transmitted through the colored dots. More specifically, in the case that the dots are colored in red and orange and that the LED emits cyan light (complementary to red), the red dots are not illuminated in appearance and only the orange dots are illuminated. Accordingly, in the case that the dots are arranged so as to image dancing, it is possible to form a lighting pattern such that a dancing image is made visible according to a manner of light emission from the LED. As another example, a stripe pattern of blue, green, and red lines arranged in this order may be formed on the panel member, and the LED may be operated so as to sequentially emit yellow, magenta, and cyan lights respectively corresponding to the complementary colors to blue, green, and red. In this case, the line having the color complementary to the color of the light emitted from the LED is not illuminated in appearance and the other lines are illuminated, thus imaging a flow of illuminated lines of different colors.

The panel member 50 is not necessarily required to have a pattern, but may be a colorless (or colored) transparent or semitransparent solid member having no pattern. The user may put an arbitrary sheet like member between the panel member 50 and the surface lighting portion 44. In this case, at least a part of the sheet like member is preferably transparent or semitransparent for the purpose of use of the surface lighting portion 44. For example, a photograph, picture, characters, etc. may be printed in various colors on a transparent sheet like member such as an OHP sheet, and the transparent sheet like member thus printed may be cut into a desired size. The size of the transparent sheet like member may be smaller than that of the panel member 50.

Having thus described a preferred embodiment of the present invention, various modifications may be made.

According to an aspect of the portable terminal apparatus of the present invention, the whole of the panel member forming a part of the housing can be illuminated, so that the area of the lighting portion can be enlarged to thereby improve the visibility. Accordingly, in the case of using the surface lighting portion for the notification of incoming calls, the user can easily recognize the incoming calls even when the portable terminal apparatus is placed somewhat apart from the user. Further, by changing the lighting pattern according to a caller upon receiving an incoming call, the caller can be identified more easily as compared with an existing lamp for merely notifying incoming calls.

In particular, by using a panel member having a pattern, the illuminated condition solely by the surface lighting portion can be modified by the panel member. That is, by changing panel members having different patterns, the effect of illumination can be changed with the same lighting pattern provided by the surface lighting portion. Conversely, the same pattern of the panel member can be made differently visible by changing the on/off state or color of emergent light from the surface lighting portion. Accordingly, by the combination of the lighting patterns of the surface lighting portion and the patterns of the panel member, it is possible to obtain various illuminated conditions that cannot be obtained solely by either the surface lighting portion or the panel member. Further, the user can easily customize the portable terminal apparatus by replacing the panel member with another one.

Thus, the combination of the surface lighting portion and the panel member provides means capable of appealing to user's vision intensively and variously. Accordingly, the surface lighting portion can be used not only for the notification of incoming calls, but also for enjoyment as illumination.

The panel member replaceable is a simple flat plate like member that is not required to have any special functional portions such as a locking pawl and therefore to perform a forming process therefore, so that the panel member can be manufactured at a low cost.

According to another aspect of the portable terminal apparatus of the present invention, the visibility of illumination can be further improved by using the surface lighting portion and the hinge lighting portion in combination. Further, various lighting patterns can be obtained by the combination of the surface lighting portion and the hinge lighting portion, so that a suitable lighting pattern can be selected according to an event or user's taste. Accordingly, the notification of incoming calls, for example, can be effectively made by means of light.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A portable terminal apparatus comprising:
   a housing;
   a surface lighting portion provided on the outer surface of said housing and including a light source and a light guiding plate for guiding light emitted from said light source and scattering said light from one surface,
   wherein the light guiding plate, which is a flat plate like member having substantially the same shape as that of the surface lighting portion, is disposed on a sheet like reflecting member to reflect upwardly the vertically downward light scattered from the light guiding plate;
   a panel member detachably mounted on said housing so as to cover said surface lighting portion, at least a part of said panel member being transparent or semitransparent; and
   a control portion for controlling lighting patterns of said surface lightning portion;
   wherein said control portion controls said lightning patterns of said surface lightning portion according to an event occurring in said apparatus such that the light emitted from said surface lighting portion is transmitted through said panel member.

2. A portable terminal apparatus according to claim 1, wherein said surface lighting portion has a flat outer surface; said panel member comprises a flat plate like member; and said housing has means for holding said flat plate like member placed on said flat outer surface of said surface lighting portion.

3. A portable terminal apparatus according to claim 1, wherein said apparatus has a communication function, and the whole of said surface lighting portion is illuminated upon receiving an incoming call.

4. A portable terminal apparatus according to claim 1, further comprising means for changing a lighting pattern provided by said surface lighting portion according to a caller upon receiving an incoming call.

5. A portable terminal apparatus according to claim 4, wherein said panel member comprises a plurality of panel members adapted to be selectively mounted on said housing, each of said panel members having information for specifying said lighting pattern; said apparatus further comprising means for detecting said information and means for controlling said lighting portion according to said information detected by said detecting means.

6. A portable terminal apparatus having a communication function, comprising:
   an upper housing having an inner surface and an outer surface;
   a lower housing;
   a hinge portion for pivotably connecting said upper housing and said lower housing so that said upper housing is foldable with respect to said lower housing;
   a hinge lighting portion provided at said hinge portion for illumination in the condition where said upper housing is folded with respect to said lower housing;
   a surface lighting portion provided on the outer surface of said upper housing; and
   control means for controlling lighting patterns of said hinge lighting portion and said surface lighting portion independently and selectively.

7. A portable terminal apparatus according to claim 6, wherein said control means comprises means for variably controlling said lighting patterns of said hinge lighting portion and said surface lighting portion according to an event occurring in said apparatus.

8. A portable terminal apparatus according to claim 7, wherein said event comprises at least two of calling, speaking, and charging.

9. A portable terminal apparatus according to claim 6, wherein said control means comprises means for changing the lighting pattern of at least said surface lighting portion according to a caller upon receiving an incoming call.

10. A portable terminal apparatus according to claim 6, wherein said control means comprises means for variably controlling said lighting patterns of said hinge lighting portion and said surface lighting portion according to a user instruction.

11. A portable terminal apparatus according to claim 6, wherein said hinge lighting portion has a semicylindrical light guiding member at said hinge portion, so that light emerging from said hinge lighting portion is visible in a direction parallel to the outer surface of said surface lighting portion at least in the folded condition of said upper housing.

12. A portable terminal apparatus according to claim 11, wherein said light emerging from said hinge lighting portion is visible also in a direction perpendicular to the outer surface of said surface lighting portion.

* * * * *